United States Patent [19]

Tirumalai

[11] Patent Number: 5,664,193
[45] Date of Patent: Sep. 2, 1997

[54] METHOD AND APPARATUS FOR AUTOMATIC SELECTION OF THE LOAD LATENCY TO BE USED IN MODULO SCHEDULING IN AN OPTIMIZING COMPILER

[75] Inventor: Partha P. Tirumalai, Fremont, Calif.

[73] Assignee: Sun Microsystems, Inc., Mountain View, Calif.

[21] Appl. No.: 560,086

[22] Filed: Nov. 17, 1995

[51] Int. Cl.$^6$ .................................................. G06F 9/45
[52] U.S. Cl. ........................ 395/705; 395/709; 395/588
[58] Field of Search .................................. 395/705, 709, 395/588

[56] References Cited

U.S. PATENT DOCUMENTS

| | | | |
|---|---|---|---|
| 5,367,651 | 11/1994 | Smith et al. | 395/700 |
| 5,367,687 | 11/1994 | Tarsy et al. | 395/700 |
| 5,491,823 | 2/1996 | Ruttenburg | 395/700 |
| 5,537,620 | 7/1996 | Breternitz, Jr. | 395/700 |

OTHER PUBLICATIONS

"Register Allocation for Modulo Scheduled Loops: Strategies, Algorithms and Heuristics", by B.R. Rau, M. Lee, P.P. Tirumalai, M.S. Schlansker, Computer Systems Laboratory, HPL-92-48, Apr. 1992, pp. 1-34.

"Parallelizations of While Loops on Pipelined Architectures", by Parthasarathy P. Tirumalai,Meng Lee, and Michael S. Schlansker, Hewlett-Packard Laboratories, The Journal of Supercomputing, 5. (1991), pp. 119-136.

"Code Generation Schema for Modulo Scheduled Loops", B. Ramakrishma Rau, Michael S. Schlansker, P.P. Tirumalai, Hewlett-Packard Laboratories, 1992, pp. 158-169.

"UltraSparc Unleashes SPARC Performance", Next–Generation Design Could Put Sun Back in Race, by Linley Gwennap, Microprocessor Report, The Insiders Guide to Microprocessor Hardware, Oct. 3, 1994, vol. 8, No. 13, pp. 5-9.

"Partners in Platform Design", To create a successful new high–performance processor, the chip architects and compiler designers must collaborate from the project's very start, Focus Report, by Marc Tremblay and Partha Tirumalai, Sun Microsystems, Inc. IEEE Spectrum, Apr. 1995, pp. 20-26.

"Overlapped Loop Support in the Cydra5", by James C. Dehnert, Apogee Software, Inc., Peter Y.T. Hsu, Sun Microsystems, Inc., and Joseph P. Bratt, Ardent Computer, pp. 26-38, 1989, ACM.

"Parallelization of Loops With Exits On Pipelined Architectures", by P.Tirumalai, M. Lee, M.S. Schlansker, Hewlett–Packard Laboratories, 1990, pp. 200-212.

(List continued on next page.)

*Primary Examiner*—Alvin E. Oberley
*Assistant Examiner*—Kakali Chaki
*Attorney, Agent, or Firm*—Erwin J. Basinski

[57] ABSTRACT

Apparatus and methods are disclosed for determining a load latency value to use in scheduling instructions for a target program, (the load latency value is the separation between a load command and the using instruction, wherein the expected return of the data is a function of where in the system the requested data resides). The instruction scheduling function is the modulo scheduling function of an optimizing compiler. Most modern microprocessors have the ability to issue multiple instructions in one clock cycle and/or possess multiple pipelined functional units and typically multi-level memory devices such as on-chip cache, off-chip cache as well as main memory. For such microprocessors this invention can, where applicable, accelerate the execution of modulo-scheduling loops in the target program code. The invention consists of a technique to determine an optimal load latency value given an rmii vector, which is a set of rmii values which correspond to different values of instruction load latency. The disclosed invention makes the determination of the optimal load latency an automatic feature of the optimizing compiler thereby not requiring the user to specify the load latency and or change the specified load latency values if the target program is to be recompiled to run on a different target computer platform.

8 Claims, 8 Drawing Sheets

OTHER PUBLICATIONS

"The Cydra5 Departmental Supercomputer", Design Philosophies, Decisions, and Trade-offs, by B. Ramakrishna Rau, David W. L. Yen, Wei Yen, and Ross A. Towle, Cydrome, Inc., Computer, Jan. 1989, pp. 12–35.

"Sentinel Scheduling for VLIW and Superscalar Processors", by Scott A. Mahike, William Y. Chem, Wen-mei W. Hwu, B. Ramakrishma Rau, and Michael S. Schlansker, Hewlett-Packard Laboratories, Center for Reliable and High-Performance Computing, Universityof Ill., 1992, pp. 238–247.

"Conversion of Control Dependence to Data Dependence", by J.R. Allen, Ken Kennedy, Carrie Porterfield & Joe Warren, Depart. of Mathematical Sciences, Rice University, IBM Corporation, 1983, pp. 177–189.

"Register Allocation for Software Pipelined Loops", by B. R. Rau, M. Lee, P.P. Tirumalai, & M.S. Schlansker, Hewlett-Packard Laboratories, SIGPLAN 1992, pp. 283–299.

"Some Scheduling Techniques and An Easily Schedulable Horizontal Architecture For High Performance Scientific Computing", by B.R. Rau, and C.D. Glaeser, Advanced Processor Technology Group, ESL, Inc., Oct. 1981, pp. 183–198.

"Software Pipelining: An Effective Scheduling Technique for VLIW Machine", by Monica Lam, Depart. of Computer Science, Carnegie Mellon University, Proceedings of the SIGPLAN '88 Conference on Programming Language Design and Implementation, Jun. 22–24, 1988, pp. 318–328.

"Counterflow Pipeline Processor Architecture", Robert F. Sproull, Ivan E. Sutherland, and Charles E. Molnar, Sun Microsystems Laboratories, Inc., Apr. 1994, pp. 1–21.

"Compiler Design In C", by Allen I. Holub, Prentice Hall Software Series, 1990, pp. 673–679.

Execution of a four-stage seven iteration pipeline.

Method for computing RMII values for load latency in the range [L,H] without repeatedly setting the load latency value and then computing the corresponding RMII.

METHOD AND APPARATUS FOR AUTOMATIC SELECTION OF THE LOAD LATENCY TO BE USED IN MODULO SCHEDULING IN AN OPTIMIZING COMPILER

BACKGROUND OF THE INVENTION

1. Field of the Invention

This invention relates to the field of Optimizing Compilers for computer systems. More specifically, the invention is a method and apparatus for efficient determination of a load latency value for modulo scheduling of target program instructions during the code optimization pass of an optimizing compiler.

2. Background

It is desirable that computer programs be as efficient as possible in their execution time and memory usage. This need has spawned the development of computer architectures capable of executing target program instructions in parallel. A recent trend in processor design is to build processors with increasing instruction issue capability and many functional units. Some examples of such designs are Sun's UltraSparc™ (4 issue), IBM's PowerPC™ series (2–4 issue), MIPS' R10000™ (5 issue) and Intel's Pentium-Pro™ (aka P6) (3 issue). (These processor names are the trademarks respectively of Sun Microsystems, Inc., IBM Corporation, MIPS Technologies, Inc., and Intel Corporation). At the same time the push toward higher clock frequencies has resulted in deeper pipelines and longer instruction latencies. These and other computer processor architectures contain multiple functional units such as I/O memory ports, integer adders, floating point adders, multipliers, etc. which permit multiple operations to be executed in the same machine cycle. The process of optimizing the target program's execution speed becomes one of scheduling the execution of the target program instructions to take advantage of these multiple computing resource units or processing pipelines. This task of scheduling these instructions is performed as one function of an optimizing compiler. Optimizing compilers typically contain a Code Optimization section which sits between a compiler front end and a compiler back end. The Code Optimization section takes as input the "intermediate code" output by the compiler front end, and operates on this code to perform various transformations to it which will result in a faster and more efficient target program. The transformed code is passed to the compiler back end which then converts the code to a binary version for the particular machine involved (i.e. SPARC, X86, IBM, etc). The Code Optimization section itself needs to be as fast and memory efficient as it possibly can be and needs some indication of the computer resource units available and pipelining capability of the computer platform for which the target program code is written.

In the past, attempts have been made to develop optimizing compilers generally, and code optimizer modules specifically which themselves run as efficiently as possible. A general discussion of optimizing compilers and the related techniques used can be found in the text book "Compilers: Principles, Techniques and Tools" by Alfred V. Aho, Ravi Sethi and Jeffrey D. Ullman, Addison-Wesley Publishing Co 1988, ISBN 0-201-10088-6, especially chapters 9 & 10 pages 513–723. One such attempt at optimizing the scheduling of instructions in inner loops in computer platforms with one or more pipelined functional units is a technique called "modulo scheduling." Modulo scheduling is known in the art and is generally described in the paper titled "Parallelization of WHILE Loops on Pipelined Architectures" by Parthasarathy P. Tirumalai, Meng Lee and Michael S. Schlansker, The Journal of Supercomputing, 5, pages 119–136 (1991) which is incorporated fully herein by reference. Modulo scheduling is one form of software pipelining that extracts instruction level parallelism from inner loops by overlapping the execution of successive iterations. Modulo scheduling makes use of two values, the Minimum Iteration Interval (MII) and the Recurrence Minimum Iteration Interval (RMII) as lower bounds on the Iteration Interval (II), which is a key metric in the modulo scheduling process. These values, mii and rmii are also used in selecting the optimal load latency value to be used in the modulo scheduling process. A brief summary of modulo scheduling is contained in the detailed description section below.

Most modern computer systems architectures include a multi-level memory hierarchy. A consequence of such a design is that the latency of a load operation ("load latency") can vary for different operations and on different target computer platforms. "Load latency" is defined as the time elapsed between the issuance of the load command and the return of the requested data. As an example of various architectural differences, it is common today for a computer processor to have an on-chip cache, an off-chip cache and main memory. If the requested data is in the on-chip cache (L1) it is usually returned in a few clock cycles (1–3). If it is not in L1, but is in the off-chip cache (L2) the data is typically returned in about 10 clock cycles. And if the data has to be fetched from memory, it can take tens of clock cycles. Some computer systems architectures also possess a non-blocking cache feature, wherein the processor can continue to execute instructions even after a previous load instruction has not found the requested data in one of the caches (say L1). And if the processor can sustain multiple cache misses, it only needs to stall (i.e. wait or stop executing) when the requested data is actually needed for a computation. In such systems there is an advantage in separating the load instruction from the use of the requested data. However, there are problems associated with the separation. Too much separation can be harmful because it increases "register pressure" (i.e. the length of time a value is held in a register increases the likelihood there will be competing demands for use of the register by other instructions) and because some cases just do not benefit from the separation because of data dependency constraints. On the other hand, too little separation can result in processor stalls or wasted processor cycles. The invention disclosed herein provides a process for determining what this separation, called load latency, should be. It applies in the context of optimizing compilers which use modulo scheduling for loops in the target computer program where varying load latency conditions exist in the target computer architecture. Such systems can benefit through improved program execution speed by optimally separating the load instructions from the use of the requested data.

The prior art does not describe attempts to automatically select the load latency to be used in modulo scheduling loops as described in this invention. In the prior art, compilers have relied on user supplied directives to select the load latency. This method has the disadvantage of requiring user intervention and user expertise in selecting a proper load latency. The invention described herein consists of a scheme to derive the desired load latency value automatically without any user supplied information. Moreover, even with the same source program the desirable latency value to be used can vary depending on the target machine characteristics.

The ability to automatically select a good load latency value allows the same program to work well on a variety of target machines. This is possible because the invention can be embedded within a compiler which can then automatically generate different executables targeting different machines.

SUMMARY OF THE INVENTION

The present invention uses an elegant method to determine a Load Latency value for use in modulo scheduling target program instruction loops for a program directed to a target computer platform that contains memory devices (caches etc.) which result in varying latencies for a given load command. This invention is contained in the scheduling section of an optimizing compiler which uses modulo scheduling techniques thereby improving the execution speed of the executable code on a target computer platform.

In one aspect of the invention, a computer controlled method of automatically determining a load latency value is disclosed, where this load latency value is to be used in scheduling the executable instructions of a target computer program directed to a target computer architecture having one or more cache memories with different load latencies. The computer controlled method discloses a process of determining a minimum iteration interval ("mii") for the program instruction loop; determining an rmii vector of values which correspond to rmii values for load latencies from a smallest latency value (L) to a highest latency value (H) for the target computer architecture; of determining whether the program instruction loop is limited by data dependencies and if not then setting the load latency value equal to the highest value available for that target computer architecture; and if the program instruction loop is limited by data dependencies using a possibly lower load latency value for which the rmii value is close to the mii value.

In another aspect of the invention, a computer system is disclosed for use in compiling target computer programs having a compiler system resident therein, a load latency determination mechanism for automatically determining a load latency value to be used in modulo scheduling the target program instructions, wherein the load latency value is determined by comparing a value representing a minimum iteration interval with the values in the rmii vector.

In yet another aspect of the invention, a computer program product is disclosed, having a computer usable medium having computer readable program code mechanisms embodied therein which include computer readable mechanisms to automatically select a load latency value to be used by a compiler mechanism in modulo scheduling instructions for a target computer program.

DESCRIPTION OF THE DRAWINGS

The objects, features and advantages of the system of the present invention will be apparent from the following description in which.

NOTATIONS AND NOMENCLATURE

Figure 1:
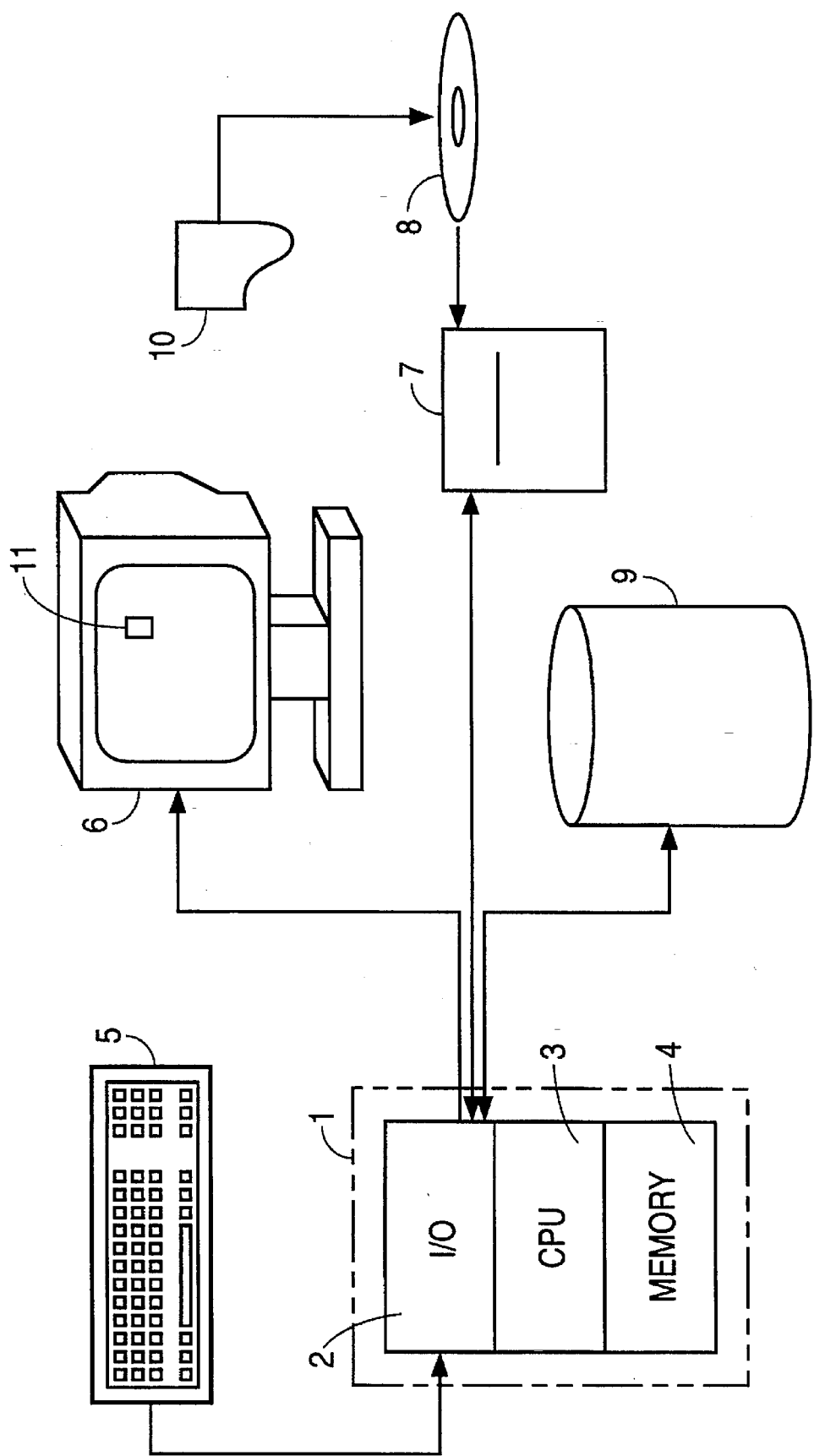
FIG. 1 illustrates a portion of a computer, including a CPU and conventional memory in which the present invention may be embodied.

The detailed descriptions which follow are presented largely in terms of procedures and symbolic representations of operations on data bits within a computer memory. These procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantifies take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be understood, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be understood the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods are disclosed for automatically determining load latency value to use in scheduling instructions for a target program, (the load latency value is the separation between a load command and the using instruction, wherein the expected time of return of the data is a function of where in the system the requested data resides). The instruction scheduling function is the modulo scheduling function of an optimizing compiler. Most modern microprocessors have the ability to issue multiple instructions in one clock cycle and/or possess multiple pipelined functional units and typically contain multi-level memory devices such as on-chip cache, off-chip cache as well as main memory. For such microprocessors this invention can, where applicable, accelerate the execution of modulo-scheduling loops in the target program code. The invention consists of a technique to determine an optimal load latency value given an rmii vector, which is a set of rmii values which correspond to different values of instruction load latency. The disclosed invention makes the determination of the optimal load latency an automatic feature of the optimizing compiler thereby not requiring the user to specify the load latency and or change the specified load latency values if the target program is to be recompiled to run on a different target computer platform. It will be apparent to one skilled in the art that the present invention may be practiced without the specific details of this automatic load latency computation disclosed herein. In some instances, well known circuits and devices are shown in block diagram form in order not to obscure the present invention unnecessarily. Similarly, in the preferred embodiment, use is made of SUN Microsystems uni-processor and multi-processor computer-systems as well as the SOLARIS operating system, including specifically the ULTRASPARC processor and the SUN SPARC compiler version 4.0, all of which are made and sold by Sun Microsystems, Inc. the assignee of this present invention. However the present invention may be practiced on other computer hardware systems and using other operating systems.

Operating Environment.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data.

Figure 2:
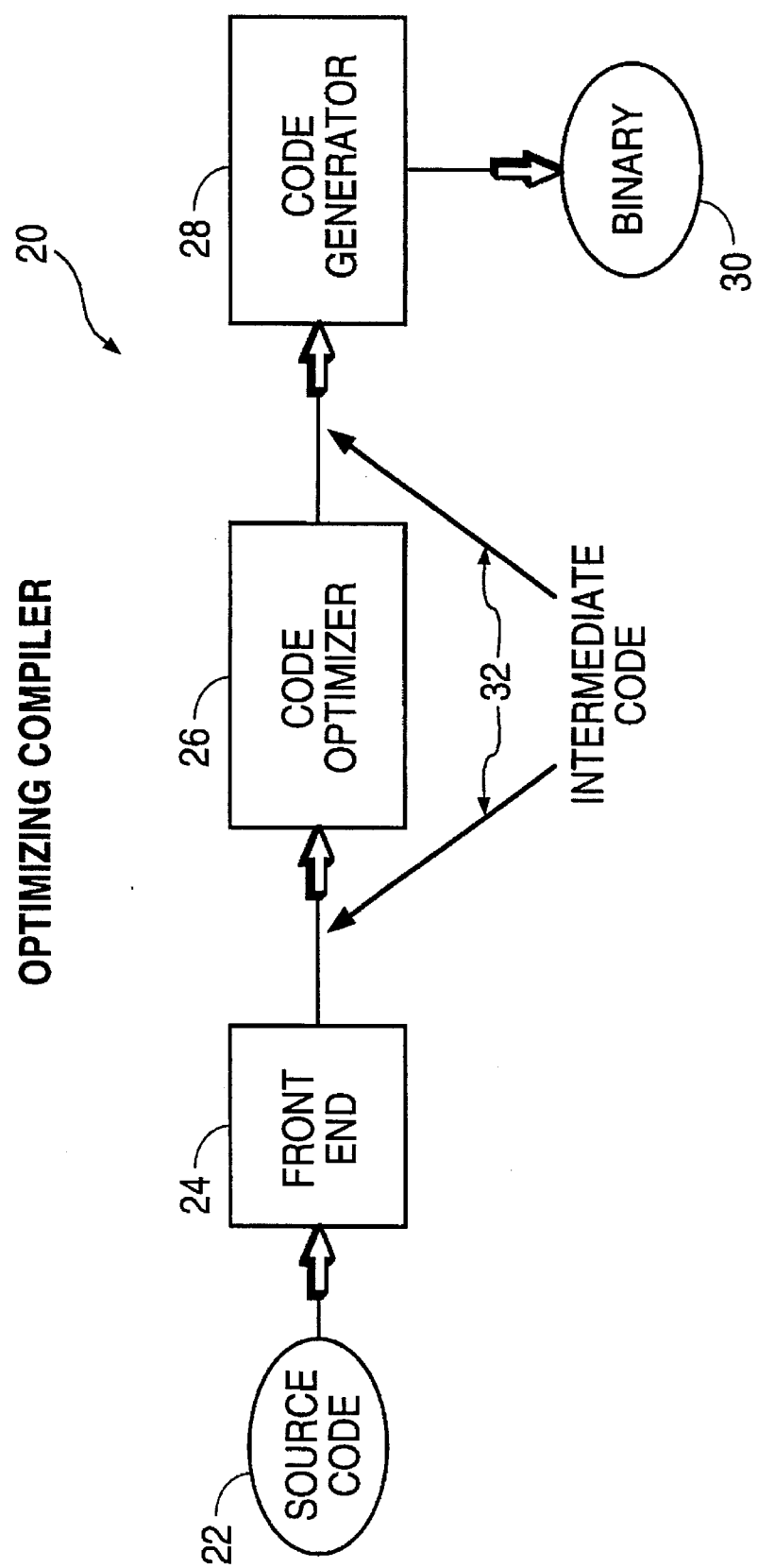
FIG. 2 illustrates a typical compiler showing the position of the code optimizer.

FIG. 2 illustrates a typical optimizing compiler 20, comprising a front end compiler 24, a code optimizer 26 and a back end code generator 28. The front end 24 of a compiler takes as input a program written in a source language 22 and performs various lexical, syntactical and semantic analysis on this language outputting an intermediate set of code 32 representing the target program. This intermediate code 32 is used as input to the code optimizer 26 which attempts to improve the intermediate code so that faster-running machine binary code 30 will result. Some code optimizers 26 are trivial and others do a variety of computations in an attempt to produce the most efficient target program possible. Those of the latter type are called "optimizing compilers" and include such code transformations as common sub-expression elimination, dead-code elimination, renaming of temporary variables and interchange of two independent adjacent statements as well as register allocation.

Figure 3:
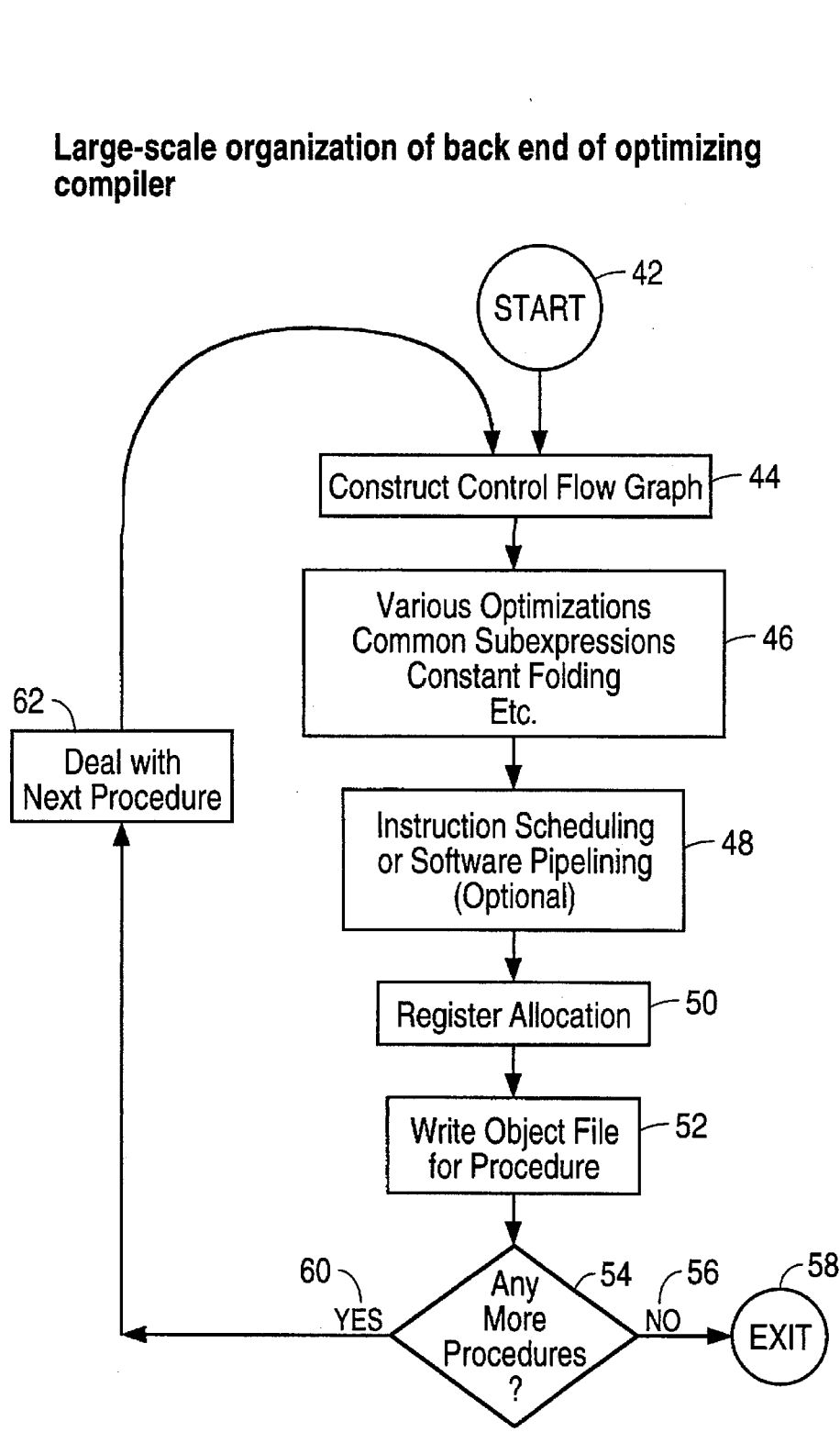
FIG. 3 illustrates a large scale organization of a code optimizer.

FIG. 3 depicts a typical organization of an optimizing compiler 40. On entry of the intermediate code 42 a Control Flow Graph is constructed 44. At this stage the aforementioned code transformations (common sub-expression elimination, dead-code elimination, renaming of temporary variables and interchange of two independent adjacent statements, etc.) take place 46. Next instruction scheduling or "pipelining" may take place 48 at this point. Then "register allocation" is performed 50 and the modified code is written out 52 for the compiler back end to convert it to the binary language of the target machine (i.e. SPARC, X86, etc). It is this "Instruction Scheduling" 48 process which is the focus of applicants' invention.

Modulo Scheduling

Figure 4:
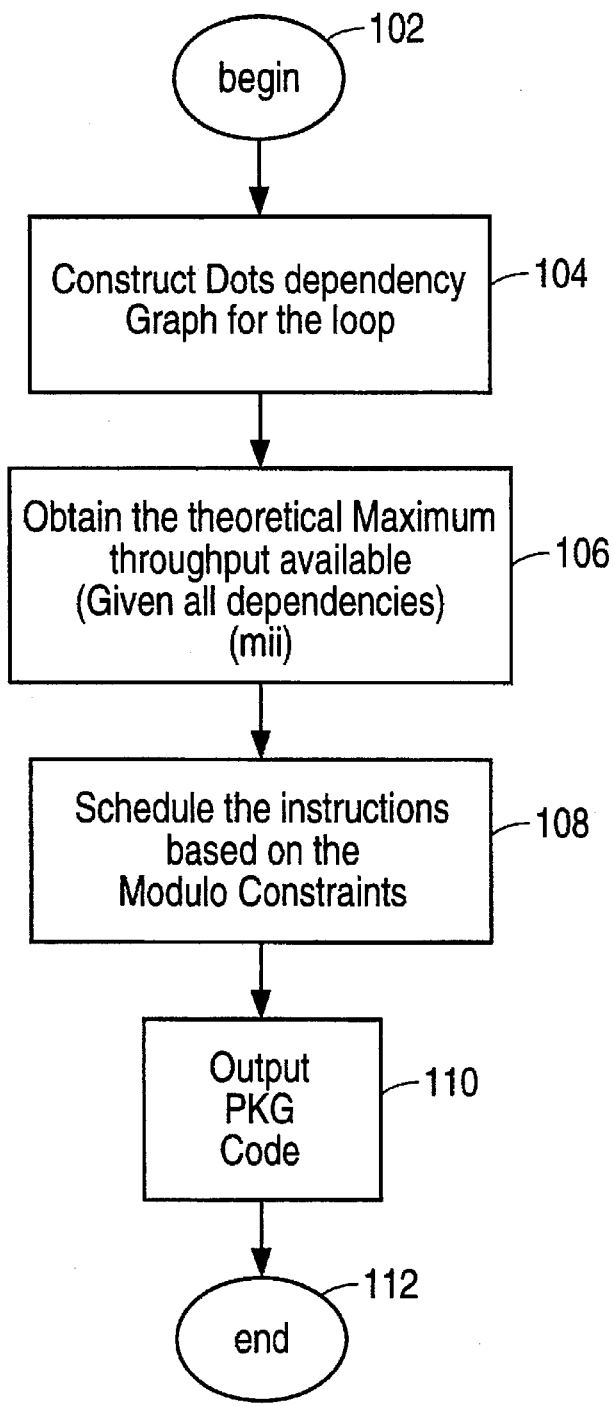
FIG. 4 illustrates an organization of the Instruction Scheduling portion of FIG. 3 as typical in the Prior Art use of modulo scheduling.

Referring now to FIG. 4, a general flow chart of the prior art Optimizing Compiler Modulo Scheduling operation is depicted 100. Upon entry to this section of the Optimizing Compiler 102 incoming intermediate data is processed and the data representing a loop is used to construct a Data Dependency Graph (DDG) 104. Using this DDG the scheduler determines a theoretical maximum throughput possible for this loop, given all the data dependencies and the resource requirements 106. That is, considering the data dependencies of each instruction and the resource requirements (such as a memory port, integer add unit, floating point unit, etc.) a calculation is made to determine the minimum iteration interval (mii) and the recurrence minimum iteration interval (rmii). Next all instructions in the loop are scheduled obeying the modulo constraint 108. The output of the scheduling pass 108 is a schedule in PKE format 110, and the scheduling process for the loop is completed 112.

Brief Summary of Modulo Scheduling

Figure 5:
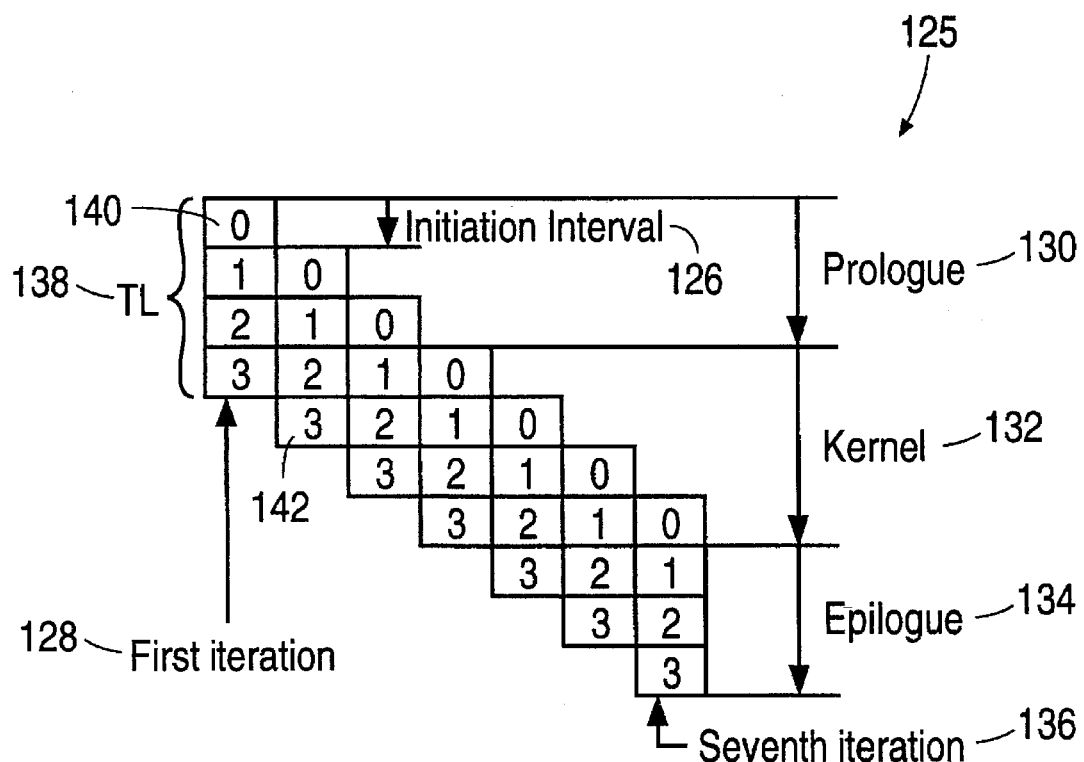
FIG. 5 illustrates a four-stage seven iteration pipeline.

Modulo scheduling has been described in the literature as indicated above. Nevertheless it is helpful at this point to summarize the process for completeness. The key principles are as follows. Parallel instruction processing is obtained by starting an iteration before the previous iteration has completed. The basic idea is to initiate new iterations after fixed time intervals. This time interval is called the initiation interval or the iteration interval (II). FIG. 5 shows the execution of seven iterations of a pipelined loop. If we let the scheduled length of a single iteration be TL 138 and let it be divided into stages each of length II 126. The stage count, SC is defined as, SC=[TL/II], or in this case TL=4 (138 in FIG. 5) and II=1 126 and SC=[4/1]=4. Loop execution begins with stage 0 140 of the first iteration 128. During the first II cycles, no other iteration executes concurrently. After the first II cycles, the first iteration 128 enters stage 1 and the second iteration 142 enters stage 0.

New iterations join every II cycles until a state is reached when all stages of different iterations are executing. Toward the end of loop execution no new iterations are initiated and those that are in various stages of progress gradually complete.

These three phases of loop execution are termed the prologue 130, the kernel 132 and the epilogue 134. During the prologue 130 and the epilogue 134 not all stages of successive iterations execute; this happens only during the kernel phase 132. The prologue 130 and the epilogue 134 last for (SC−1)* II cycles. If the trip count of the loop is large (that is, if the loop is of the type where say 100 iterations of the loop are required), the kernel phase 132 will last much longer than the prologue 130 or the epilogue 134. The primary performance metric for a modulo scheduled loop is the initiation interval, II 126. It is a measure of the steady state throughput for loop iterations. Smaller II values imply higher throughput. Therefore, the scheduler attempts to derive a schedule that minimizes the II. The time to execute n iterations is, $T(n)=(n+SC-1)\times II$. The throughput approaches II as n approaches infinity.

Scheduling proceeds as follows. The data dependence graph (DDG) for the loop is constructed. Nodes in this (directed) graph correspond to instructions, and arcs to dependencies between them. Arcs possess two attributes: latency and omega. Latency is the number of clocks of separation required between the source and the destination, and omega is the iteration distance between the two. (That is, if one iteration calculates a value for the destination instruction which is to be used in the next iteration, the omega value would be 1). Prior to scheduling, two bounds on the maximum throughput, the MII and the RMII, are derived. The MII is a bound on the minimum number of cycles needed to complete one iteration and is based only on processor resources. It is a bound determined by the most heavily used resource. For example, if a loop has 10 add operations and the processor can execute at most two adds per clock (that is, it has two add units), then the add unit resource would limit the iteration throughput to at most one iteration every five clocks (that is, 10 add operations divided by 2 add units per clock cycle=5 clock cycles to do the 10 adds). The MII is computed by taking each resource in turn and then taking the maximum of the bounds imposed by each. The RMII is a bound based on the minimum number of clocks needed to complete one iteration and is based only on dependencies between nodes. Cycles in the DDG imply that a value Xj computed in some iteration i is used in a future iteration j and is needed to compute the similarly propagated value in iteration j. These circular dependencies place a limit on how rapidly iterations can execute because computing the values needed in the cycle takes time. For each elementary cycle in the DDG, the ratio of the sum of the instruction latencies (1) to the sum of the omegas (d) is computed. This value limits the iteration throughput because it takes 1 clocks to compute values in a cycle that spans d iterations. That is, if a dependency edge i in a cycle has latency $d_i$ and connects operations that are $\Omega_i$ iterations apart, then, RMII=maximum over all elementary cycles of ($\Sigma d_i$ cycle edges divided by $\Sigma \Omega_i$ cycle edges).

For example, if an address add self-recurrence takes $\Sigma d_i=3$ cycles and generates the address for use in the next iteration (i.e. omega=1) then RMII=3/1=3.

The fixed spacing between overlapped iterations forces a constraint on the scheduler other than the normal constraints imposed by the arcs in the DDG. Note that placing an operation at a time t implies that there exists a corresponding operation in the kth future iteration at (t+k *II). Operations using the same resource must be placed at different times, modulo the II value. This is referred to as the "modulo constraint". It states that if an operation uses a resource at time $t_1$ and another operation uses exactly the same resource at time $t_2$, then $t_1$ and $t_2$ must satisfy "$t_1$modulo II is not equal to $t_2$modulo II". The scheduler begins by attempting to derive a schedule using II=max(MII, RMII). If a schedule is not found, the II is incremented. The process repeats until a schedule is found or an upper limit is reached. After scheduling, the kernel has to be unrolled and definitions renamed to prevent values from successive iterations from overwriting each other. "Unrolling the kernel" is defined as creating multiple copies of the kernel in the generated code. The minimum kernel unroll factor (KUF) needed is determined by the longest value lifetime divided by the II because corresponding new lifetimes begin every II clocks. (The "lifetime" of a value is equal to the time for which a value exists; i.e. from the time its generation is started until the last time it is used or could be used). Remainder iterations (up to KUF-1) use a cleanup loop.

The problem

Unpredictable load latencies

The time to complete a load varies depending on whether the access hits or misses in the cache (or caches in the case of multi-level cache hierarchy). What latency then should the modulo scheduler use when scheduling loads? High values could stretch the schedule and create register pressure. Low values could result in bubbles or stalls. In the preferred embodiment, two policies are used in conjunction to decide the value to be used. The first policy is to schedule integer loops (no floating point accesses) to the L1 cache, and the others (floating point loops) to the L2 cache. (The L1 cache is an on-chip cache which is fed by a slower off-chip cache, L2, which itself is typically fed by local memory or even a local disk memory.). There are three reasons that motivate this. First, integer programs tend to have good hit rates in L1. Second, scheduling them to L2 would create high register pressure as both data and addresses vie for the limited integer registers. Note that with floating point loops, data resides in the fp registers whereas addresses reside in the integer registers. And third, integer loops tend to have low trip counts. Long load latencies are less effective on such low trip counts because of the higher start up cost.

The second policy is based on an examination of the DDG. If the loop is limited by an RMII cycle that contains a load-use edge, then such a loop is not likely to benefit from the long latency used. For such loops, the load latency is dropped until the RMII and the MII are about equal. Lowering the latency further does not help the loop because it will then be constrained by the MII. This novel strategy helps many RMII limited loops. It is an analytical way of approximating the effect of program directives that have been previously supplied to such loops. Implementation of this policy requires that the concept of the RMII be extended to the RMII vector, each element of which corresponds to different values of the load latency. These details are described below.

In most modern computer systems the latency of a load operation (the time elapsed between the issue of the load instruction and the return of the requested data) can vary depending on many factors. Modulo scheduling loops on such machines requires that allowance be made for such variation in the load latency. As indicated above, one important parameter used in the modulo scheduling process is the RMII. The RMII can vary depending on the load latency used during scheduling. This means that different values of RMII can be computed for each different load latency. Here these different values are referred to as the RMII vector. Computing the RMII for even one load latency is time consuming, and consequently computing it many times for each different load latency would be even more time consuming.

Figure 6:
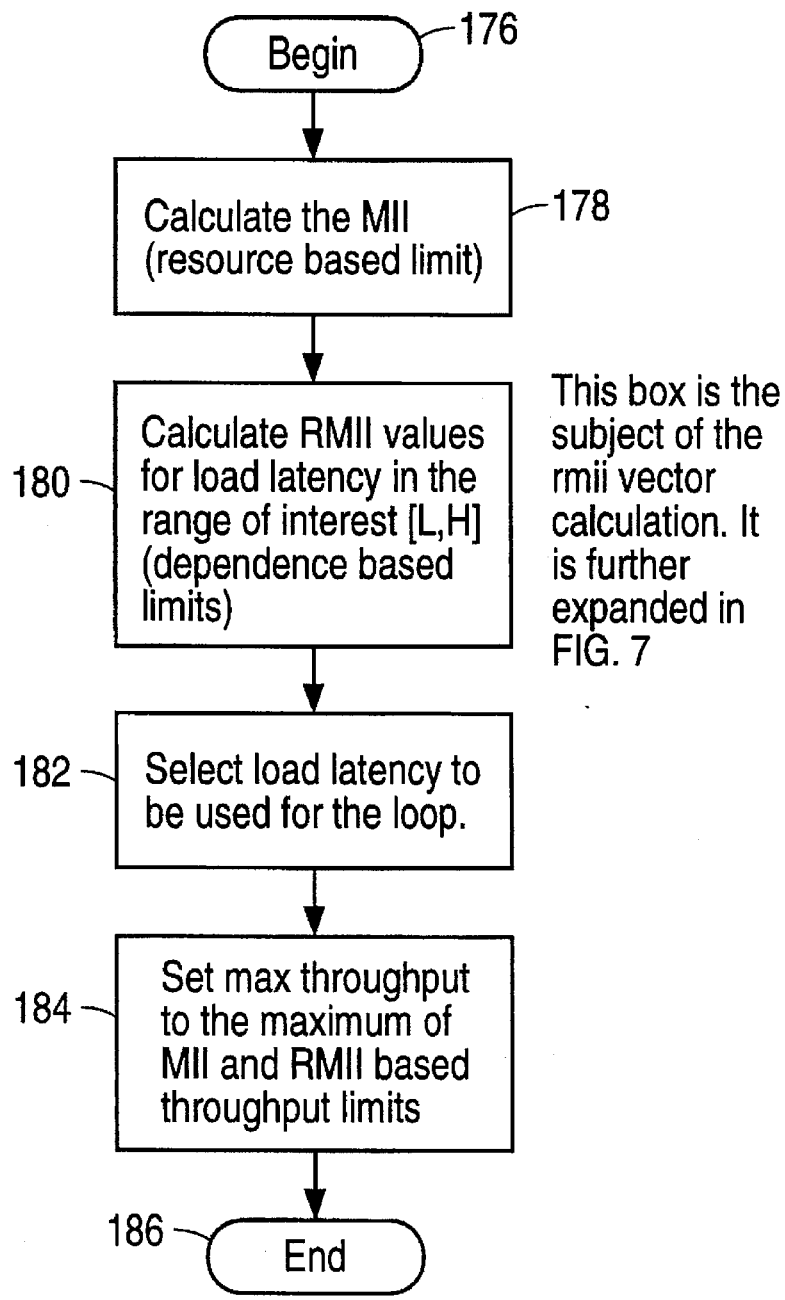
FIG. 6 illustrates in more detail a process for determining the theoretical maximum throughput available considering all resource and dependence constraints.

Referring to FIG. 6, the portion of the modulo scheduling process which obtains the theoretical maximum throughput estimates considering all data and resource dependencies is described. This will indicate where the values mii and rmii are determined and how they are used.

In FIG. 6 the process for obtaining the theoretical maximum throughput bounds 175 (this expands box 106 of FIG. 4) is depicted. In FIG. 6 on entry 176 the value for mii is calculated 178. As described above, the MII is a lower bound on the number of clock cycles needed in steady state to complete one iteration and is based only on processor resources. It is a bound determined by the most heavily used resource. For example, if a loop has 10 add operations and the processor can execute at most two adds per clock (that is, it has two add units), then the add unit resource would limit the iteration throughput to at most one iteration every five clocks (that is, 10 add operations divided by 2 add units per clock cycle=5 clock cycles to do the 10 adds). The MII is computed by taking each resource in turn and then taking the maximum of the bounds imposed by each. Then rmii values for load latency in the range of interest [L, H] are calculated 189. An appropriate load latency is selected for use in the scheduling of the loop instructions 182. (It is this automatic selection of the load latency that is the subject of the present invention and which is described in more detail below.) The maximum throughput is set to the maximum of the computed mii and rmii values 184 for the selected load latency and this routine exits 186 to the scheduling routine.

Efficient Determination of an RMII Vector for Modulo Scheduled Loops

Figure 7:
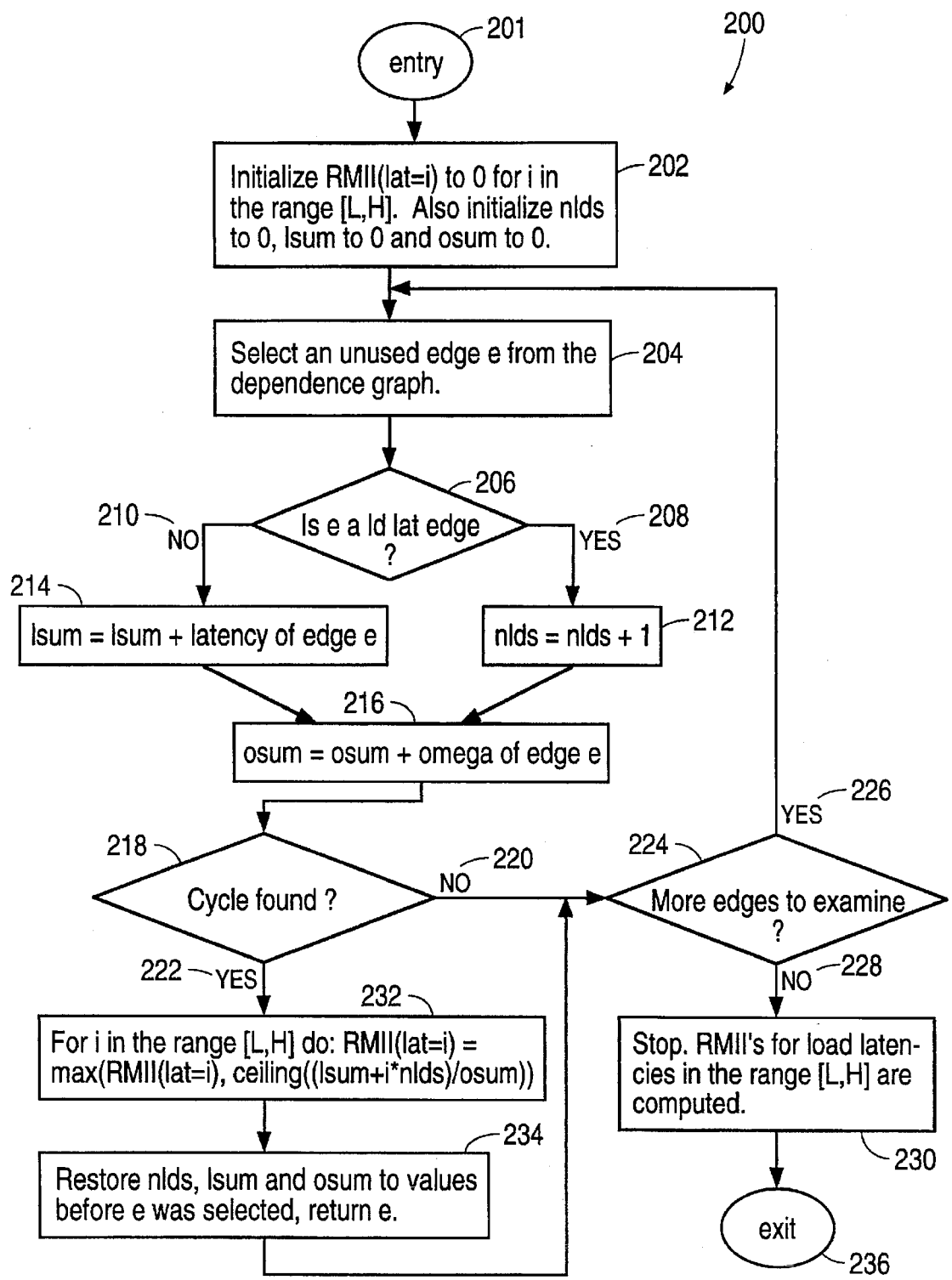
FIG. 7 illustrates a flow chart showing the process for determining the rmii vector.

Referring now to FIG. 7 the basic process of producing the rmii vector is summarized 200. To understand the following description some additional background information is necessary. The target program instruction loop in consideration can be represented by a data dependence graph (DDG). Each directed edge in the graph represents a dependence. Three attributes on the edges are required: whether this edge is a load latency or not; the latency of the edge (required only if it is NOT a load latency edge); and the omega value on the edge. FIG. 7 depicts the process for computing rmii values for load latency in the range [L, H] without repeatedly setting the load latency value and then computing the corresponding rmii. The values "L" and "H" are load latency values representing the lowest load latency and highest load latency respectively for resources (i.e. caches and other memory devices) in the architecture of the target computer platform. These values are set in the compiler based on this target architecture. Upon entry to this process 201 values are initialized for nlds (the number of load latency edges), lsum (the sum of the latencies encountered), osum (the sum of the omega values encountered) and the elements of the rmii vector are set to zero. Next a search is made for elementary cycles in the graph. An elementary cycle is a cycle where no node in the cycle is visited more than once except the node where the cycle is started and ended which is visited twice. In this search, unused edges in the DDG are traversed successively while looking for cycles. The process is as follows. Select an unused edge "e" from the graph 204. If this edge e is a load latency edge 208, the value nlds is incremented by one 212. If edge e is not a load latency edge 210 then the value lsum is incremented by the latency value associated with edge e 214. In either case 216 the value osum is incremented by the value of omega associated with edge e. If e forms a cycle 222 update the rmii vector as follows. For each load latency i, compute the ceiling of (lsum+i*nlds)/osum. (Note "ceiling" in this context means the next highest integer value. That is if the value after the division is a fraction, not on integer the value will be replaced with the next highest integer value. For example, if the computation "(lsum+ i*nlds)/osum" was "(5+2*2)/2"=2.5, then the ceiling of this value 2.5 is 3, the next highest integer. Note also that the value "osum" must be greater than zero if an elementary cycle is found.) Let this value be "$v_i$". Then, update the rmii value at each latency i as, rmii(i)=max(rmii(i), $v_i$). This is equivalent to the process shown in block 232. The values nlds, lsum and osum are restored to the values before edge e was selected 234 and the search for more edges proceeds 224. If the edge e does not form a cycle 220 then another edge is examined 224. This process continues until there are no more edges to be examined 228 and this process is complete 236.

The fundamental idea here is to keep track of three independent items as each cycle is found. These three items are the number of load latency edges, the total latency of the other edges and the total omega of all of the edges. Knowing these three items for any cycle allows the rmii contribution of a cycle to be computed very quickly for any load latency. This is the value "$v_i$" above. Then as each cycle is detected, the entire rmii vector can be updated. Together the separation of these three contributing items and the updating of the rmii vector after cycle detection provide for the computation of the rmii vector with only a small amount of extra work over computing the rmii for a single load latency. With this mechanism in place, the rmii need not be computed afresh for each load latency.

An Example

Here is an example of how the rmii vector calculation works. Let L=2 and H=8 for this example.

First the vector is initialized to be all zero for each load latency: [0 0 0 0 0 0 0]→each element corresponds to the RMII for a particular load latency in the range 2 through 8.

Then the DDG is searched. Suppose that we find a cycle with lsum=5, nlds=1 and osum=2. Then the rmii vector is updated for each load latency as follows:

i=2: rmii(lat=2)=max{0, ceil((5+2*1)/2)}=max {0, 4}=4 i=3: rmii(lat=3)=max{0, ceil((5+3*1)/2)}=max{0, 4}=4 i=4: rmii(lat=4)=max{0, ceil((5+4*1)/2)}=max{0, 5}=5 . . . and so on.

Thus the rmii vector at the end of the updating will look like this:

[4455667]

The DDG will continue to be searched and suppose that the next cycle that is found has lsum=5, nlds=0 and osum=1. The rmii vector will then be updated as follows:

i=2: rmii(lat=2)=max{4, ceil((5+2*0)/1)}=max{4, 5}=5 i=3: rmii(lat=3)=max{4, ceil((5+3*0)/1)}=max{4, 5}=5 i=4: rmii(lat=4)=max{5, ceil((5+4*0)/1)}=max{5, 5}=5 . . . and so on.

At the end of this step the rmii vector will look like this: [5555667]

This process will continue until the DDG has been completely searched. Suppose that the rmii vector when this happens looks like this:

[7 8 9 10 11 12 13]→RMII vector at the end of the search.

This means that the rmii values for various load latencies are as follows:

for load latency=2 the rmii is 7 for load latency=3 the rmii is 8 . . . and so on.

Thus, RMII values for all load latencies in the range of interest 2 through 8 have been computed.

The invention—Automatic selection of a desirable Load Latency value for scheduling.

Consider a loop that is to be scheduled for some target machine. Assume that the load latency is to be selected for this loop from the range [L, H], both ends included. L denotes the low or minimum value and H denotes the high or maximum value. Both are positive integers.

In the first step, the mii or the minimum iteration interval is computed for the loop. The mii is described above. It is a bound on how fast the loop can execute on a machine ignoring data dependencies. The mii does not depend on the load latency and so only one mii value is computed.

In the second step, various values of rmii or the recurrence minimum iteration interval are computed for the loop. The rmii is described above also. It is a bound on how fast the loop can execute ignoring resource limitations: The prior art literature only describes one rmii value for a loop because the idea of automatically selecting the load latency from a desirable range is new. As indicated in detail above, an rmii vector is computed in the preferred embodiment. Since the rmii can depend on the load latency used, different values of the rmii can be computed for each different load latency in the permissible range [L,H]. This sequence of values is called the rmii vector.

Figure 8:
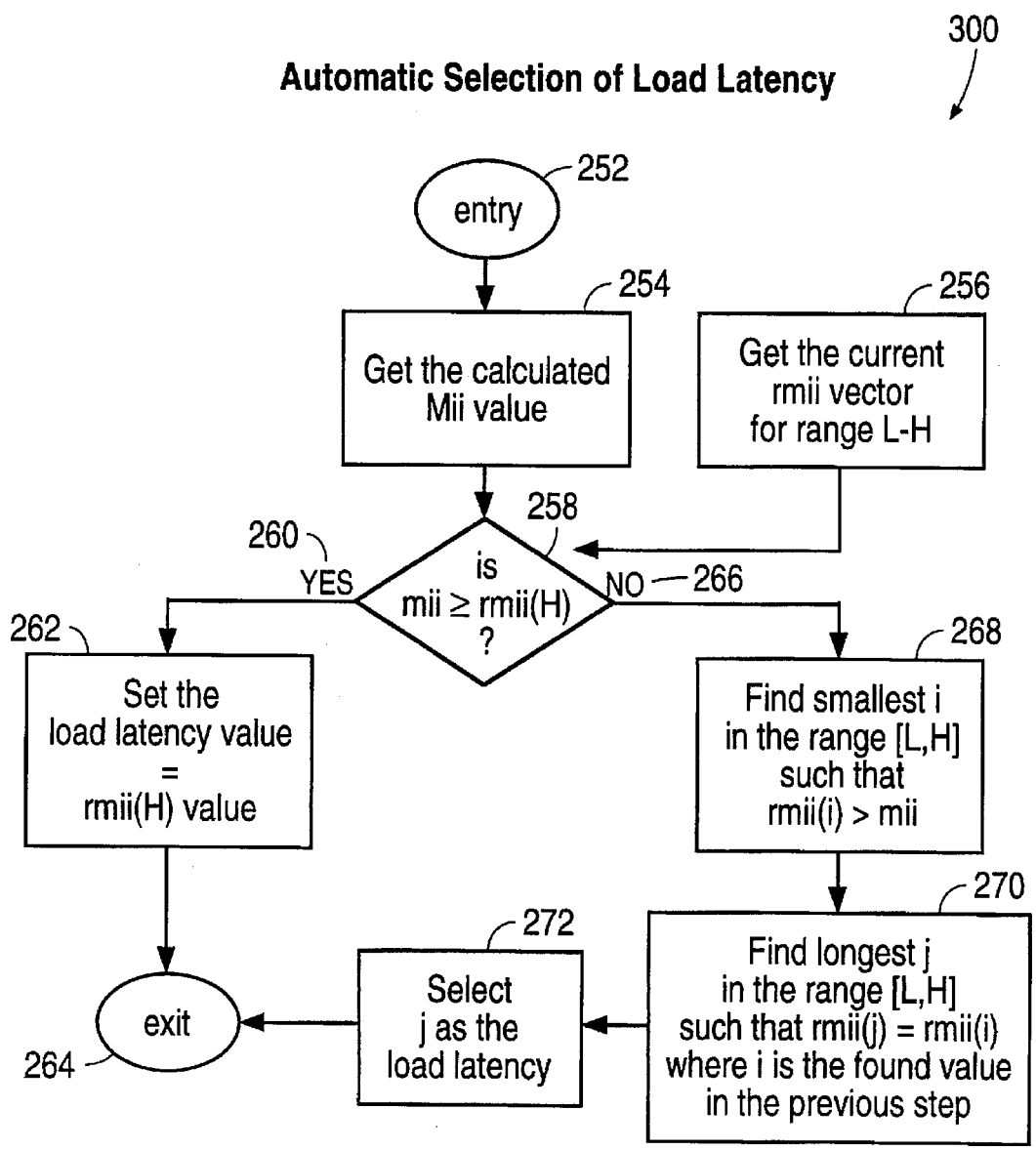
FIG. 8 illustrates a flow chart showing the process for determining the load latency.

Referring now to FIG. 8, the process of automatically selecting the load latency value is depicted 250. Upon entry to the load latency select routine 252 the previously determined mii value and rmii rector are obtained 254, 256. The mii value is compared to the rmii value at the high end of the latency range H 258 and if the mii is greater than or equal to the rmii(H) 260 the load latency value is set equal to H 262 and the process exits 264. If the mii value is less than the rmii(H) 266 then the process attempts to find the smallest i in the range [L,H] such that rmii(i) is greater than the mii 268. Note that there must be oare such is in the rough [L, H] because from the previous step one arrives at theis point only if rmii (H)>mii. When found, the process then finds the largest j in the range [L,H] such that rmii(j)=rmii(i) 270, where i is the value found in step 268. The load latency value is set equal to j 272 and the process exits 264.

The fundamental principle is to use the value of mii and the rmii vector (the values of rmii for various load latencies) in deciding the precise load latency for modulo-scheduling the loop. The above process ensures that loops that are not limited by data dependencies are scheduled at the highest load latency possible. Loops that are limited by data dependencies are scheduled at potentially lower latency. This is desirable because these loops being data dependent would not benefit from scheduling at the higher latency. The above process also ensures that for these loops, the load latency used is no higher than it needs to be for effective scheduling of the loop. This is desirable because increasing the latency further would not benefit the loop as it would already be limited by data dependencies.

An Example

Here is an example showing load latency selection.

Let L=2, H=8.

Let the RMII values for load latencies in the range [2,8] be successively [3 3 4 4 5 5 6] and let the MII be 4.

In the selection, process we first ask the question:

Is MII>=RMII with load lat=8? That is, is 4>=6 ?, here. The answer to this is No.

Now we find the smallest i the range [2, 8] such that RMII with load latency=i is>MII. Here this i value is 6 because the RMII value with load latency=6 is 5 which is greater than the MII which is 4.

Next we find the largest j in the range [2, 8] such that RMII with load latency=j is equal to 5. This value is 7 because we can see that RMII with load latency=7 is the same as the RMII with load latency=6 (both are 5, two 5's in a row).

This value (7) is selected as the load latency to be used for the loop and processing continues by marking all load latencies with this value, setting the RMII for the loop to the value at this latency and so on.

Essentially, when the MII is not>=RMII with load lat=H, we find the first point in the RMII vector which is above the MII and then keep moving fight as long as it does not change.

Additional Considerations

It will be appreciated by those skilled in the art that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer controlled method for determining a load latency value associated with a program instruction loop, for use in an optimizing compiler in scheduling the executable instructions of a target program directed at a target computer architecture having one or more cache memories with different load latencies, said method comprising the steps of:

a. determining a minimum iteration interval value for the program instruction loop;

b. providing a range of load latency values which represent a smallest latency value and a largest latency value that is representative of the target computer architecture, said range comprising consecutive integer values from a value representing the smallest latency to a value representing the largest latency of the target computer architecture;

c. determining an rmii vector of values the elements of which correspond to each load latency in the range of load latency values;

d. determining whether the program instruction loop is limited by data dependencies and if not then setting the load latency value equal to the largest latency of the target computer architecture; and e. if the program instruction loop is limited by data dependencies, setting the load latency value such that the rmii at this load latency approximately equal to the minimum iteration interval value.

2. The method of claim 1 wherein the step of determining whether the program instruction loop is limited by data dependencies comprises the steps of:

comparing the mii value to the rmii value at the high end of the range of latency values H and if the mii value is greater than or equal to the rmii value corresponding to (H), then setting the load latency value equal to H.

3. The method of claim 1 wherein the step of setting the load latency value that the rmii at this load latency is approximately equal to the minimum iteration interval value comprises the steps of:

finding a smallest load latency at which the rmii value (say v) is greater than the mii value;

finding the largest load latency value at which the rmii value is equal to v, setting the load latency equal to said found largest load latency value.

4. A computer controlled method of determining a load latency value associated with a program instruction loop, for use in an optimizing compiler in scheduling the executable instructions of a target program directed at a target computer architecture having memories with different load latencies, said method comprising the steps of:

a. determining a minimum iteration interval value for the program instruction loop;

b. providing a range of load latency values which represent a smallest latency value and a largest latency value that is representative of the target computer architecture, said range comprising consecutive integer values from a value representing the smallest latency to a value representing the largest latency of the target computer architecture;

c. determining an rmii vector of values the elements of which correspond to each load latency in the range of load latency values;

d. determining whether the program instruction loop is limited by data dependencies by comparing the mii value to the rmii value at the high end of the range of latency values H and if the mii value is greater than or equal to the rmii value corresponding to (H), then setting the load latency value equal to H; and e. if the program instruction loop is limited by data dependencies, finding a smallest value in the rmii vector which is greater than the mii value; setting the load latency equal to said found largest load latency value;

f. finding the largest load latency value in the rmii vector which is associated with the found smallest value in the rmii vector; and g. setting the load latency value approximately equal to the minimum iteration interval value which represents the data dependency iteration limits for the loop to be scheduled.

5. A computer system having a central processing unit (CPU) and random access memory (RAM) coupled to said CPU, for use in compiling a target program to run on a target computer architecture having one or more cache memories with different load latencies, said computer system comprising:

a compiler system resident in said computer system having a front end compiler, a code optimizer and a back end code generator;

a first load latency determination mechanism comprising load latency values for at least a portion of the target program instructions to be scheduled, said load latency determination mechanism coupled to said code optimizer;

a second load latency determination mechanism configured to automatically determine a load latency value to use in scheduling said instructions by comparing a value representing a minimum iteration interval, mii, with an rmii vector of values; and a modulo scheduler mechanism coupled to said code optimizer configured to modulo schedule instructions for said target program by using said determined load latency value.

6. An apparatus for optimizing the execution time of executable instructions in a target program which is designated to run on a target computer architecture having one or more cache memories with different load latencies, said apparatus comprising:

a computer having a processor, a memory, and an input/output section;

a compiler system resident in said computer memory having a front end compiler, a code optimizer and a back end code generator;

a first load latency determination mechanism comprising load latency values for at least a portion of the target program instructions to be scheduled, said load latency determination mechanism coupled to said code optimizer;

a second load latency determination mechanism configured to automatically determine a load latency value to use in scheduling said instructions by comparing a value representing a minimum iteration interval, mii, with an rmii vector of values; and a modulo scheduler mechanism coupled to said code optimizer configured to modulo schedule instructions for said target program by using said automatically determined load latency value in scheduling said instructions.

7. A code optimizer for use in an compiler system for compiling a target program to run on a target computer architecture having one or more cache memories with different load latencies, said code optimizer comprising:

a first portion configured to accept as input an intermediate code representation of said target program;

a second portion, coupled to said first portion, configured to determine an rmii vector of values for at least a portion of the target program instructions to be scheduled, said load latency determination mechanism coupled to said code optimizer;

a third portion, coupled to said second portion, configured to automatically determine a load latency value to use in scheduling said instructions by comparing a value representing a minimum iteration interval, mii, with said rmii vector; and a fourth portion, coupled to said third portion configured to modulo schedule instructions for said target program by using said automatically determined load latency value in scheduling said instructions.

8. A computer program product comprising:

a computer usable medium having computer readable program code mechanisms embodied therein to schedule the executable instructions of a target program directed at a target computer architecture having one or more cache memories with different load latencies, the computer readable program code mechanisms in said computer program product comprising:

computer readable compiler system resident in said computer system having a front end compiler, a code optimizer and a back end code generator;

computer readable load latency determination code mechanisms to determine an rmii vector of values for at least a portion of the target program instructions to be scheduled;

additional computer readable load latency determination code mechanisms to automatically determine a load latency value to use in scheduling said instructions by comparing a value representing a minimum iteration interval, mii, with said rmii vector; and a computer readable modulo scheduler code mechanism coupled to said code optimizer configured to modulo schedule instructions for said target program by using said automatically determined load latency value in scheduling said instructions.

* * * * *